US 7,479,240 B2

(12) United States Patent
Jhi et al.

(10) Patent No.: US 7,479,240 B2
(45) Date of Patent: *Jan. 20, 2009

(54) BORON OXIDE AND RELATED COMPOUNDS FOR HYDROGEN STORAGE

(75) Inventors: Seung-Hoon Jhi, Albany, CA (US); Young-Kyun Kwon, Albany, CA (US); Keith Bradley, Oakland, CA (US); Jean-Christophe P. Gabriel, Pinole, CA (US)

(73) Assignee: Nanomix, Inc., Emeryville, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 11/271,446

(22) Filed: Nov. 9, 2005

(65) Prior Publication Data

US 2006/0165577 A1 Jul. 27, 2006

Related U.S. Application Data

(63) Continuation of application No. 10/267,792, filed on Oct. 8, 2002, now Pat. No. 6,991,773.

(60) Provisional application No. 60/404,588, filed on Aug. 19, 2002.

(51) Int. Cl.
*C09K 3/00* (2006.01)
(52) U.S. Cl. .............................. 252/182.32; 252/182.35
(58) Field of Classification Search ............ 252/182.32, 252/182.35
See application file for complete search history.

(56) References Cited

U.S. PATENT DOCUMENTS 6,991,773 B2 * 1/2006 Jhi et al. .................. 423/648.1

FOREIGN PATENT DOCUMENTS

JP 4-26502 * 1/1992 .............. 423/658.2

* cited by examiner

*Primary Examiner*—Wayne A. Langel
(74) *Attorney, Agent, or Firm*—Weaver Austin Villeneuve & Sampson LLP

(57) ABSTRACT

A hydrogen storage medium is provided, where the medium is comprised of boron oxide and closely related compounds such as orthoboric acid, metaboric acid, hydrated boric acid, and disodium borohydrate. The medium is substantially an amorphous glassy network, albeit with local regions of order, pores, and networks that provide surface area. Hydrogen is adsorbed by the medium with a heat of adsorption of about 9 kJ/mol to about 13 kJ/mol, a value which is higher than that of the heat of adsorption of hydrogen on carbon. The value for the heat of adsorption of hydrogen on the inventive storage medium is provided by computation, and corroborated by experimental observation. The higher heat of adsorption of the medium provides for operation at temperatures higher temperatures higher than those provided by carbon. Further provided are methods by which the storage medium can be prepared in such a form so as to permit high capacity hydrogen storage, as well as an apparatus, with the inventive medium disposed therein, for storing hydrogen.

19 Claims, 10 Drawing Sheets

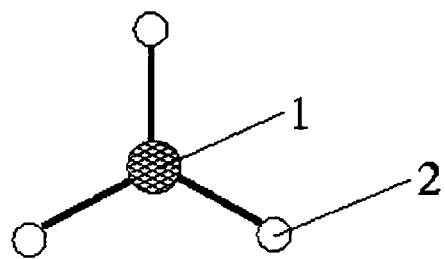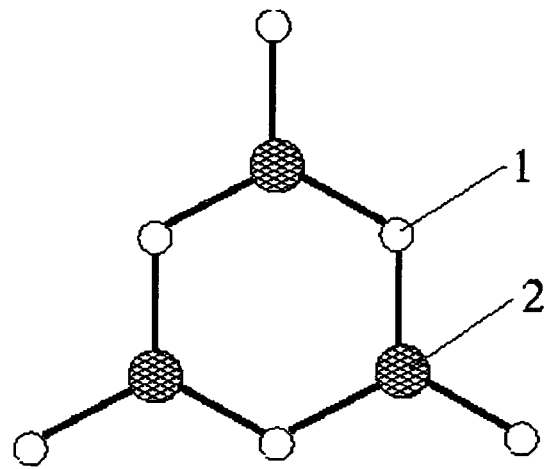
FIG. 3                    FIG. 4.

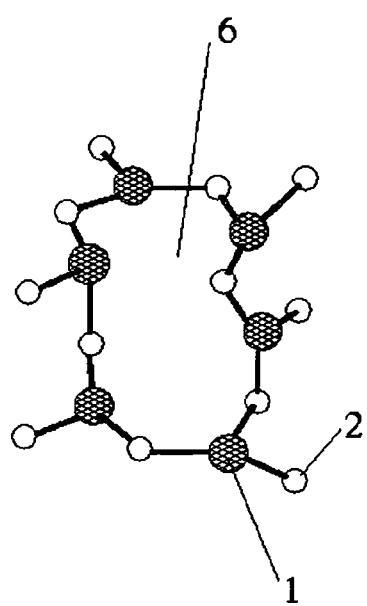
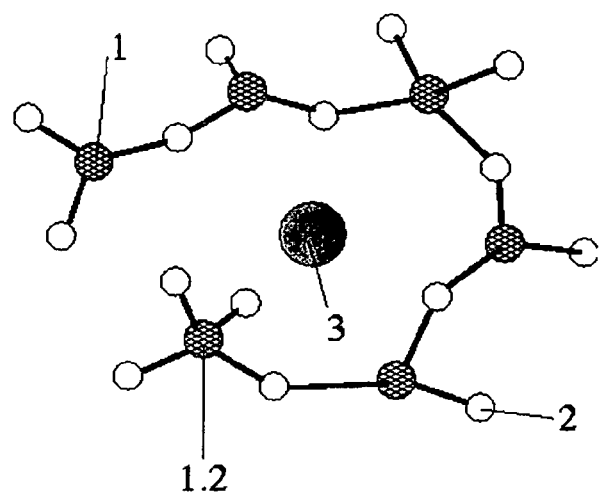
FIG. 7   FIG. 8

BORON OXIDE AND RELATED COMPOUNDS FOR HYDROGEN STORAGE

RELATED APPLICATION DATA

This application is a continuation of application Ser. No. 10/267,792, filed Oct. 8, 2002 (now U.S. Pat. No. 6,991,773) which claims priority to provisional application Ser. No. 60/404,588, filed Aug. 19, 2002, which applications are incorporated herein, in their entirety, by reference.

FIELD OF THE INVENTION

This invention relates generally to hydrogen storage systems, more specifically, to storage of hydrogen in a medium that comprises boron oxide and related compounds.

BACKGROUND OF THE INVENTION

There is considerable interest in hydrogen as a replacement for fossil fuels because of its high energy density per unit weight, its readily availability through the electrolysis of water, and the absence of polluting byproducts from its use. A number of technological components represent challenges in making this transition from fossil fuels to hydrogen, and in the development of appropriate systems and infrastructure that can integrate into those that already exist. A particular challenge of the developing hydrogen economy and the automotive industry thus involves the current paucity of fully satisfactory systems for hydrogen storage, ones that are safe, reliable, conformable, light-weight, and comprehensively economic. The technological issues underlying various approaches to hydrogen storage include the form within which hydrogen is stored, the nature of the medium holding the hydrogen, and the operation of the containers holding the medium.

Holding hydrogen as a compressed gas and as a cryogenic liquid are the most traditional forms of hydrogen storage. Compressed hydrogen can be stored in high pressure tanks (up to 10,000 p.s.i.). A problem with this method is that hydrogen diffuses very effectively, particularly when under high pressure, and currently available high pressure tanks do not effectively prevent such diffusion over an extended period of time. The requirement that tank materials be lightweight, and the fact that tank failure or damage in the event of an accident would be catastrophic provides further reason for pause. Storage of hydrogen in liquid form, at cryogenic temperatures is also an approach that shows some promise.

Metal hydrides, such as magnesium-based alloys, have also been used as media to store hydrogen. Although this method does not require high pressure and is operable at room temperature, there are other drawbacks. Metal hydrides are heavy, generally heavier than the hydrogen gas by a factor of about 50. Metal hydrides also undesirably contaminate the hydrogen as it is released. Further, metal hydride storage is not energy-efficient in this context; the energy required to extract the hydrogen from the metal hydride is equivalent to nearly half the amount stored within it. Metal hydride storage has been disclosed by Liu et al. (U.S. Pat. No. 4,358,316), by Bernauer et al. (U.S. Pat. No. 4,446,101), and by Ovshinsky et al. (U.S. Pat. No. 6,328,821).

Activated carbon has been used to store hydrogen at cryogenic temperatures and moderate pressures (50-70 bar), as has been described by Schwarz (U.S. Pat. No. 4,716,736). Cryogenic storage in activated carbon can be done at a 80K, a temperature higher than that required for liquid hydrogen storage. Hydrogen can sorb to surfaces in the activated carbon and can be released by increasing the temperature. Commonly available activated carbon, however, is not very pure, and contaminants are released with the hydrogen. Many researchers have found that it is difficult to obtain release of all hydrogen stored on activated carbon. Other problems associated with activated carbon include low weight percent storage capacity and the need to maintain cryogenic temperatures. Some of these problems have been discussed by Hynek et al. 1997, in "Hydrogen storage by carbon sorption," Int. J. Hydrogen Energy, 22, No. 6, 601.

Alternative forms of carbon for hydrogen storage that are being explored include carbon nanotubes and graphite fibers, which, according to Rodriguez et al. (U.S. Pat. Nos. 5,653,951 and 6,159,538), sorb hydrogen by chemisorption. Another approach using nanostructured materials, in this case comprised of light elements, is one in which hydrogen is bound by physisorption, as described in pending patent applications of Bradley et al. (U.S. Application No. 60/020,392) and Kwon et al. (U.S. Application No. 60/020,344). Other carbon-based approaches include the utilization of turbostratic microstructures, as described by Maeland (U.S. Pat. No. 6,290,753) and aerogel preparations of carbon fullerenes, as described by Lamb (U.S. Pat. No. 5,698,140). While structured forms of carbon offer advantages over non-structured activated carbon, the basic thermodynamic properties of carbon which determine the low operating temperatures at which hydrogen is desorbed from the medium remain the same.

Hydrogen storage and supply systems that operate at higher temperatures and lower pressures than those currently available are an important and as yet undeveloped component of the developing hydrogen economy. Porous storage media represent a realistic approach to the development of such systems, and thus there is an acute need for materials which offer high capacity and favorable operating conditions of temperature and pressure. It is further desirable that such media be manufacturable economically, and at industrial scale.

SUMMARY OF THE INVENTION

In accordance with the embodiments of the present invention, a medium for storing hydrogen is provided. This medium comprises solid boron oxide and compounds closely related to it such as orthoboric acid, metaboric acid, hydrated boric acid, and disodium borohydrate. Hydrogen sorbs to the compounds comprising the medium with a heat of adsorption in the range of about 9 kJ/mol to about 13 kJ/mol. In accordance with some embodiments, the medium can be modified by the inclusion of various alkali metal dopants such as lithium. This hydrogen sorbing or occlusion is substantially physisorptive in nature, but may include chemisorptive sorbing as well.

The heat of adsorption of hydrogen on the boron oxide medium is substantially higher than that of hydrogen on carbon. From this higher heat of absorption, it follows that at a given temperature within an operating temperature range of about 50 to about 200K, and with results normalized to respective surface area, a boron oxide-based medium sorbs more hydrogen than a carbon-based medium. Expressed in another way, boron-oxide based media can be loaded with hydrogen and hold it at a temperature range significantly higher than that at which carbon-based media operates. Hydrogen sorption and desorption are also pressure dependent. Thus, at pressures in the range of 1 bar, boron oxide media sorb hydrogen at about twice the level of carbon, when data are normalized to surface area. The pressure range of 1 bar to 30 bar is a desirable pressure range for the operation of hydrogen storage vessels. At a pressure of 20 bar, for example, whereas temperature driven desorption of hydrogen from carbon occurs over a range of about 50K to about 150K, temperature driven desorption from boron oxide and related compounds occurs over a range from about 100K to about 200K.

Further features and advantages of the present invention will become apparent to those of ordinary skill in the art in view of the detailed description of preferred embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings.

FIG. 3 shows a $BO_3$ triangle, a planar boron oxide structure with a boron atom situated centrally within three oxygen atoms.

FIG. 4 shows a boroxol ring, a six-membered boron oxide ring structure consisting of three boron atoms and three oxygen atoms.

FIG. 7 shows a perspective view of a local pore structure within a random boron oxide network.

FIG. 8 shows a perspective view of a local pore structure within a random boron oxide network that has been doped with a metal atom.

DETAILED DESCRIPTION OF THE INVENTION

Figure 1:
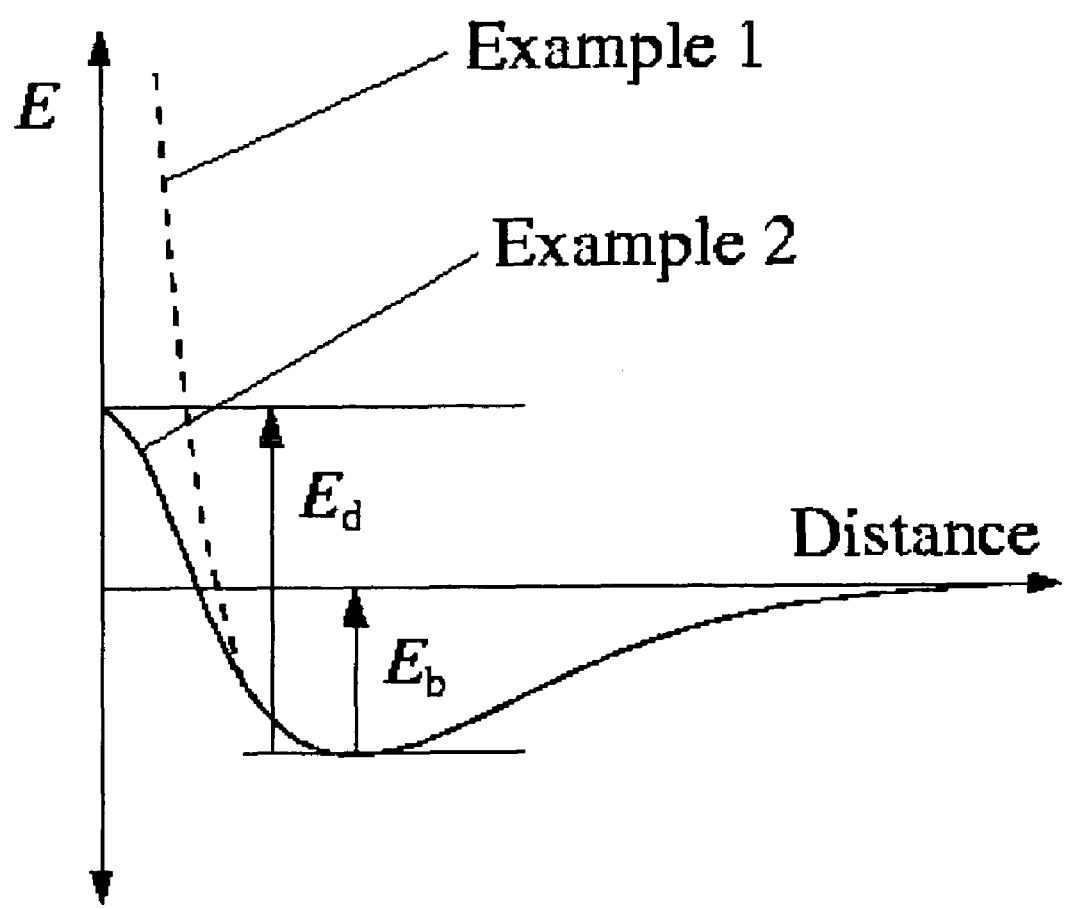
FIG. 1 is a graphic representation of the computational approach to determination of the heat of adsorption, or sorbing energy, between a gas and a solid.

Storage of Hydrogen by Host Media and the Heat of Adsorption

Adsorption of gas on solid media occurs through both physical and chemical means. The physical interaction, or physisorption, involves weak bonds, such as van der Waals interaction, between an adsorbate such as hydrogen gas and the host medium; there is no chemical bond involved in this form of adsorption. Chemical interaction, or chemisorption, by contrast, involves the stronger interaction of chemical bonding between an adsorbing gas and the host medium. There are also clear differences in the energy of activation between these two forms of adsorption; chemisorption has a high activation energy, and is essentially adiabatically irreversible, thus making desorption a slow process. Physisorption, in contrast, has a very low, if not immeasurable activation energy; it is thus highly reversible, and desorption is fast. The sorbing of hydrogen on boron oxide is considered to be substantially by physisorption, although some degree of chemisorption is also possible. Further, to define terms used in this disclosure, sorption is a term that embraces both adsorption and absorption. Adsorption refers to interaction between gas and the surfaces of solids; absorption refers to interaction between gas and the bulk of solids. Thus, the sorbing of hydrogen on boron oxide is considered to be substantially an adsorptive process, occurring on gas-exposed surfaces, but a degree of diffusion into bulk composition and absorption therein is also possible.

Two major operating features characterize hydrogen storage media: (1) the total hydrogen storage capacity (ratio of the weight of hydrogen stored to the weight of storage medium) and (2) the temperature and pressure ranges at which hydrogen is adsorbed and desorbed. Total hydrogen storage capacity is primarily a function of the surface area of the medium to which the gas has access, and is thus a property substantially associated with the method of material preparation. The total surface area of a solid, in spite of an overall unity, can be superficially recognized as facing the exterior of the solid, or being internal, within the bounds of the solid. External surfaces are relatively easily defined by the geometry of particles; internal surfaces are more complex and more generally defined in a functional sense. Pores and interconnected networks only act as a surface or passage way if the gas has access to them. In spite of the complexity of defining surface area geometrically, it is appreciated as a substantial determinant of gas sorbing capacity, and is generally determined by the level of nitrogen adsorption, as measured by the Brunauer-Emmett-Teller (BET) approach. The broad variety of carbonaceous materials that have been developed have achieved specific surface areas in the range of about 3,000 m$^2$/g.

The other feature of gas sorbing that underlies the temperature and pressure-dependent behavior aspect of gas sorption on media is the heat of adsorption (kJ/mol adsorbed gas); an analogous term is the sorbing energy, eV. The heat of adsorption is substantially a property specific to the chemical entities involved, the gas being bound or adsorbed and the hosting or adsorbing medium, although the methods of material preparation can have some effect. Generally, gas is bound, or occluded, by materials at low temperature, and released at high temperature. Materials with low heats of adsorption release bound gas at low temperature, while materials with high heats of adsorption retain bound gas at higher temperatures before the gas is released. Values reported for the heat of adsorption of hydrogen on carbon are in the range of about 5 kJ/mol; values in the range of 4-7 kJ/mol have been reported (Benard and Chahine 2001, Langmuir 17, 1950). Many metals, such as platinum, have relatively high heats of adsorption, but they are heavy, and their density limits the ability to prepare materials with a high surface area per unit weight. Embodiments of the present invention provide materials, boron oxide and other related compounds, which have significantly higher heats of adsorption than carbon. Further, boron oxide and related compounds comprise atoms which are light, and are thus appropriate for developing materials with high surface area per unit weight.

Thus while adsorption and desorption are processes responsive to both temperature and pressure, and while the dynamics of that relationship are determined by the heat of adsorption, in a practical sense the operational factor more affected by the heat of adsorption is temperature. This follows from a consideration of the larger system of which a storage medium is a part. In general, it is desirable and practical for a hydrogen adsorptive storage system in a vehicle to be a low pressure system compared to the conditions for compressed gas storage. Thus, when the present invention is described in terms of the pressure ranges at which it operates, these conditions adhere to system-related factors, not to limitations or constraints of the storage medium. Low pressure vessels have considerable advantages over high pressure vessels with regard to safety and acceptable shapes, and the complexity of the surrounding engineering. In general, low pressure vessels may be considered those which operate at pressures between 1 bar and 30 bar, and there remains a considerable latitude even above 30 bar which is considered low pressure compared to the operating range of true high pressure vessels (5,000-10000 p.s.i., or between about 350 and about 700 bar). An advantage offered by a storage medium with a heat of adsorption of about 10 kJ/mol, in contrast to carbon (with a heat of adsorption of about 5 kJ/mol) applies broadly to low pressure hydrogen storage systems, and allows an operating temperature range higher than that of carbon by about 50K degrees.

In order to estimate the sorbing energy of hydrogen on boron oxide and related materials, pseudopotential density functional calculations (Hohenberg and Kohn 1964, Phys. Rev. 136, B863; and Kohn and Sham 1965, Phys. Rev. 140 A113) were performed. Computation by these methods can predict key physical properties of materials such as crystal structure, electronic and optical properties, transport properties, and gas adsorption kinetics. The focus of these computations was to determine the heat of adsorption, or sorbing energy, which is denoted by the lowest point on plots of heat of adsorption as a function of distance between the solid host atoms and adsorbing hydrogen gas. The total energy was calculated through the application of the ab initio pseudopotential method (Cohen 1982, Physica Scripta T1; 5; Kleinman and Bylander 1982, Phys. Rev. Lett. 48, 1425N; Payne et al. 1992, Reviews of Modern Physics, 64, 1045; and Troullier and Martins 1991, Phys. Rev. B 43, 1993,) with atomic orbital basis (Sánchez-et al. 1997, Int. J. Quantum Chem. 65, 453 and Artacho et al. 2000, Phys. Status Solidi B 217, 335). The exchange-correlation interaction of electrons was treated with a generalized gradient approximation approach (Perdew and Burke 1996, Int. J. Quantum Chem. S57, 309; and Perdew et al. 1996, Phys. Rev. Lett. 77, 3865) that is known to be well suited for the accurate description of interaction between gases and solids.

These pseudopotential density functional computations were performed as follows: To simulate hydrogen sorption on $B_2O_3$ glass and metaboric acid, a large section of the adsorbent host material was computationally depicted as an infinitely repeated lattice. The total energy of the combined system (adsorbents and $H_2$) was then calculated using varying distances between $H_2$ and the adsorbents. At each step of the total energy calculation, an accounting was made of the full range of structural relaxations under the constraint of a fixed distance between $H_2$ and adsorbents. Once a set of values for the total energy as a function of the distance between $H_2$ and adsorbents was calculated, the data were fit with a curve appropriate for describing van der Waals interactions. The minimum total energy, as well as the distance at which the minimum occurs, were then obtained by application of Lenard-Jones and Morse curve-fitting computations.

FIG. 1 graphically represents a general computational approach to determination of the heat of adsorption, or sorbing energy, between an adsorbing gas and a host solid (Prutton 1994, Introduction to Surface Physics, Clarendon Press, Oxford; Jhi et al 2000, Physical Review Letters 85, 1710) that was applied specifically to characterization of the interaction of hydrogen gas and boron oxide as described in this disclosure. The heat of adsorption is shown as a function of the distance between the gas and the solid: the X axis represents the distance between the gas molecule and the host solid to which the gas is sorbing, and the Y axis represents the energy (E) associated with that distance. Zero on the Y axis is defined as the value of the energy asymptotically approached when the distance is at infinity; the curve may or may not cross a zero value for Y at a small distance. The lowest point, $E_b$, on the energy curve represents the value of the sorbing energy, or heat of adsorption of the most stable distance between the bound gas and the host medium. The difference between $E_b$ and the energy at the theoretical distance of zero, $E_d$, represents an approximation of the energy required for diffusion of the gas into the host solid.

The course of gas diffusion into two example solids are shown in FIG. 1 by the solid and dotted lines, respectively, connecting the most stable distance and the zero distance point. The higher the value of $E_d$, the greater is the threshold or activation energy required for inward diffusion. The dotted line (example 1) represents a case in which the threshold energy is of such large magnitude that diffusion is precluded, as would be the case if pore sizes in the host solid were too small to allow entry of gas. The solid line (example 2), by contrast, represents a case where the gas is able to diffuse into the solid. Computations such as these were used in the determination of atomic-scale pore size optimal for hydrogen diffusion and adsorption, as described below.

By these pseudopotential density function computational methods, the heats of absorption of compounds in the boron oxide genus vary from about 10 to about 13 kJ/mol, as shown in Table 1.

TABLE 1

Sorbing of Hydrogen on host Boron Oxide Species:
Computed Values for Binding Energy or Heat of Adsorption

| Chemical Species | Thermodynamic Sorbing Values | |
| --- | --- | --- |
|  | Binding Energy | Heat of Adsorption |
| $B_2O_3$ | 0.13 eV | 13 kJ/mol |
| $HBO_2$ | 0.13 eV | 13 kJ/mol |
| $H_3BO_3$ | 0.10 eV | 10 kJ/mol |
| Graphite (for reference) | 0.06 eV | 5 kJ/mol |

These heat of adsorption values for hydrogen on boron oxides species are about twice that of the heat of adsorption of hydrogen on graphite or activated carbon (about 5 kJ/mol, included in Table 1 for reference). These values, computed as described above, for carbon's heat of adsorption agree well with the results of Benard and Chahine (Langmuir 2001,17, 1950). Finally, these computed values for boron's heat of adsorption are corroborated by actual measurements of the sorbing energy of hydrogen, as described in detail in the examples section, below.

The presence of atomic-scale pores in activated carbon and other materials is well known (Dacey 1967, in The Solid-Gas Interface, ed. E. Alison Flood, Marcel Dekker, NY, Volume II, Chapter 34), and it is thus reasonable to believe that boron oxide can be prepared by methods which yield such pores as well. Computational methods have thus also been applied to a determination of the pore size optimal for hydrogen adsorbing. The adsorbing simulations were run on circular boron oxide rings of varying size, with inner intra-atomic diameters that define pores sizes of 0.34 nm, 0.46 nm, and 0.65 nm. The activation energy required to reduce the distance between the gas and the structure (represented by the portion of the curves to the left of the minimum, as shown in FIG. 1) is very large for the small pore sizes, but nearly non-existent at 0.65 nm. The high activation energy indicates that the pore is too small to provide hydrogen access into it. The heat of adsorption of hydrogen sorbing to these structures, once the 0.65 nm diameter threshold is attained, is equal to or greater than the heat of adsorption calculated for a planar boroxol ring lattice. These computations demonstrate that pores with diameters of 0.65 nm or more, within a host medium comprising boron oxide and its derivatives, provide an effective passageway for hydrogen access into such a medium.

Adsorption and desorption processes are governed by both temperature and pressure. Low temperature and high pressure favor adsorption of gas; high temperature and low pressure favor desorption. The heat of adsorption correlates to the temperature range at which gas sorbs and desorbs at a given pressure. The fact that the adsorbing energy of hydrogen on boron oxide compounds is significantly greater than the adsorbing energy of hydrogen on graphite means that at given pressure and temperature, $B_2O_3$ will adsorb more hydrogen per unit surface area than graphite or activated carbon.

Figure 2:
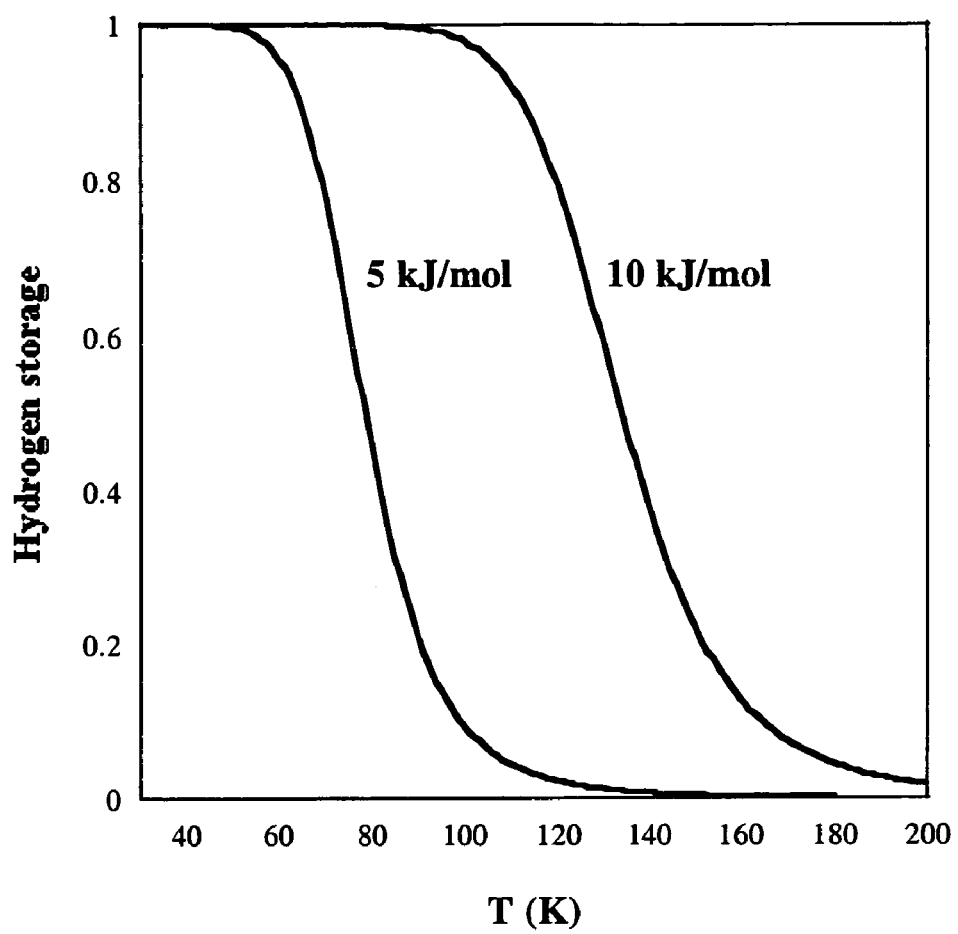
FIG. 2 shows temperature-driven desorption of hydrogen, at 20 bar, from a medium with the heat of adsorption of carbon (about 5 kJ/mol) and from a medium with the heat of adsorption of boron oxide (about 10 kJ/mol).

A pressure range which commercially practical for hydrogen storage tanks containing hydrogen-adsorptive materials is in the range of about 1 to about 30 bar, more generally in the range of about 3 bar to about 20 bar. Based on computational determination of the heat of adsorption and experimental corroboration of the large difference hydrogen sorbing to boron oxide vs. carbon (see the experimental example, below), the sorbing of hydrogen to carbon and boron oxide at 20 bar over a range of temperatures was compared using the Langmuir model. The results of the computation are shown in FIG. 2 which depicts two curves of hydrogen storage as a function of temperature: one representing hydrogen bound to carbon with a heat of adsorption in the range of approximately 5-6 kJ/mol (labeled as 5 kJ/mol), and one representing hydrogen bound to boron oxide with a heat of adsorption in the range of approximately 10-12 kJ/mol (labeled as 10 kJ/mol). It is clear from these curves that hydrogen, bound to carbon (heat of adsorption of approximately 5 kJ/mol) at low temperature, begins to desorb at about 50K, and is substantially desorbed at about 150K. On the other hand, hydrogen bound to boron oxide (heat of adsorption of approximately 10 kJ/mol), remains bound until the temperature reaches 100K, and is released progressively until the temperature reaches about 200K, at which point desorption is substantially complete. In effect, boron oxide's value for the heat of adsorption of hydrogen, being approximately two-fold higher than that of carbon, increases the operating temperature range for heat-driven desorption by about 50 degrees.

Composition of Storage Medium

Boron oxide ($B_2O_3$) occurs predominantly as a glass; the terms "glass" or "glassy state" refer to solid matter that has an amorphous structure, without long-range periodic order of atoms. A glass is generally created by cooling a glass-forming liquid to a temperature below its freezing point, which is also known as the glass transition temperature. The amorphous nature of glass allows for the presence of local areas of order or flat structures within the larger unordered solid. The difference between amorphous glass and ordered crystalline solids is fundamental and underlies easily observable differences in physical properties, such as behavior at the melting point, and the ways in which the solids break when deformation stress exceeds elasticity limits. The amorphous nature of glass also allows for the easy incorporation of other additives or so-called doping elements, non-boron oxide related compounds which can contribute to structural features within preparations of glass.

The structure of pure boron oxide includes basic units, higher order units, and local regions of order within the encompassing amorphous composition. FIG. 3. depicts the most basic unit of structure, the planar $BO_3$ triangle, wherein a boron atom 1 (dark circles represent boron atoms) is located centrally within three triangularly situated oxygen atoms 2 (open circles represent oxygen atoms). FIG. 4 depicts the next most basic unit of structure, the six-membered or hexagonal boroxol ring, composed of three $BO_3$ triangles. In this depiction it can be seen that each boron atom 1 connects to three oxygen atoms 2 (as in the $BO_3$ triangle of FIG. 1), and each oxygen atom bridges two boron atoms, each boron atom representing the center of a $BO_3$ triangle. Just as the BO3 triangles combine to form hexagonal boroxol rings, so do the rings interconnect to create latticed honey comb-like networks of interconnected hexagonal rings. These various structural configurations thus represent local regions of order in the amorphous glassy composition.

Figure 5:
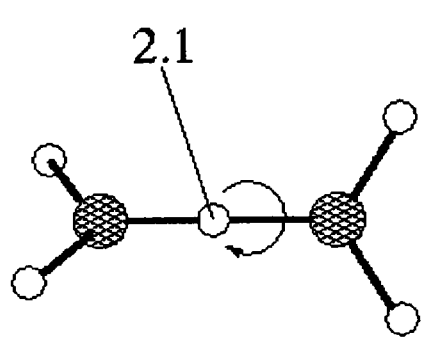
FIG. 5 shows a perspective view of two $BO_3$ triangles connected by an oxygen atom common to both triangles.
Figure 6:
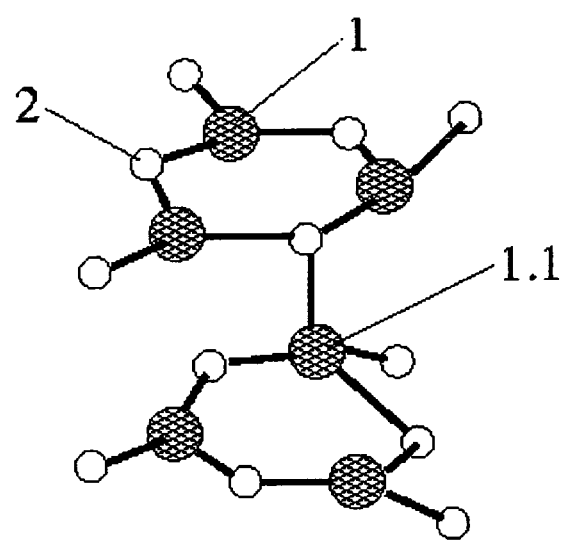
FIG. 6 shows a perspective view of two connected boroxol ring structures, one ring with each boron atom triangularly bound to three oxygen atoms and a second ring containing a boron atom with a four-fold oxygen coordination.

Various structural configurations contribute to the predominantly amorphous nature of boron oxide glass, as depicted in FIGS. 5-8. FIG. 5 focuses on the free rotation around an oxygen atom 2.1 in the triangular configuration, which can permit the formation of both ordered and disordered networks. FIG. 6 shows a variation in the boron-oxygen bonding configuration in the context of two connected boroxol rings in which four oxygen atoms sorb to a single boron 1.1, thus creating a so-called fourfold coordinated structure. The planar aspect of the triangular configuration of the $BO_3$ triangle is distorted in this case, and there is further structural variation possible through the rotation of the boroxol rings with respect to each other around this bond connecting an oxygen atom and boron atom 1.1.

FIGS. 7 and 8 depict various atomic-scale porous structural features that can occur in glassy boron oxide, depending on variables in the glass forming process and on the possible presence of additives or doping elements or compounds. FIG. 7 depicts two boroxol rings, for example, which have conjoined to create an irregular ring with a large central hole or atomic-scale pore 6 by breaking and reforming bonds of the boroxol rings. Mixing of metals, such as alkali metals, into the glass composition can also create new structural units and pore structures. FIG. 8 depicts an example in which boron oxide has been doped with lithium oxide 3, which has brought about the transformation of a triangular unit $BO_3$ into a fourfold coordinated unit $BO_4$ around the boron atom 1.2. The formation of these atomic-scale units enhances the connectivity of pore networks (Varsamis et al. 2000, Physical Review B vol. 65, 104203).

Figure 9:
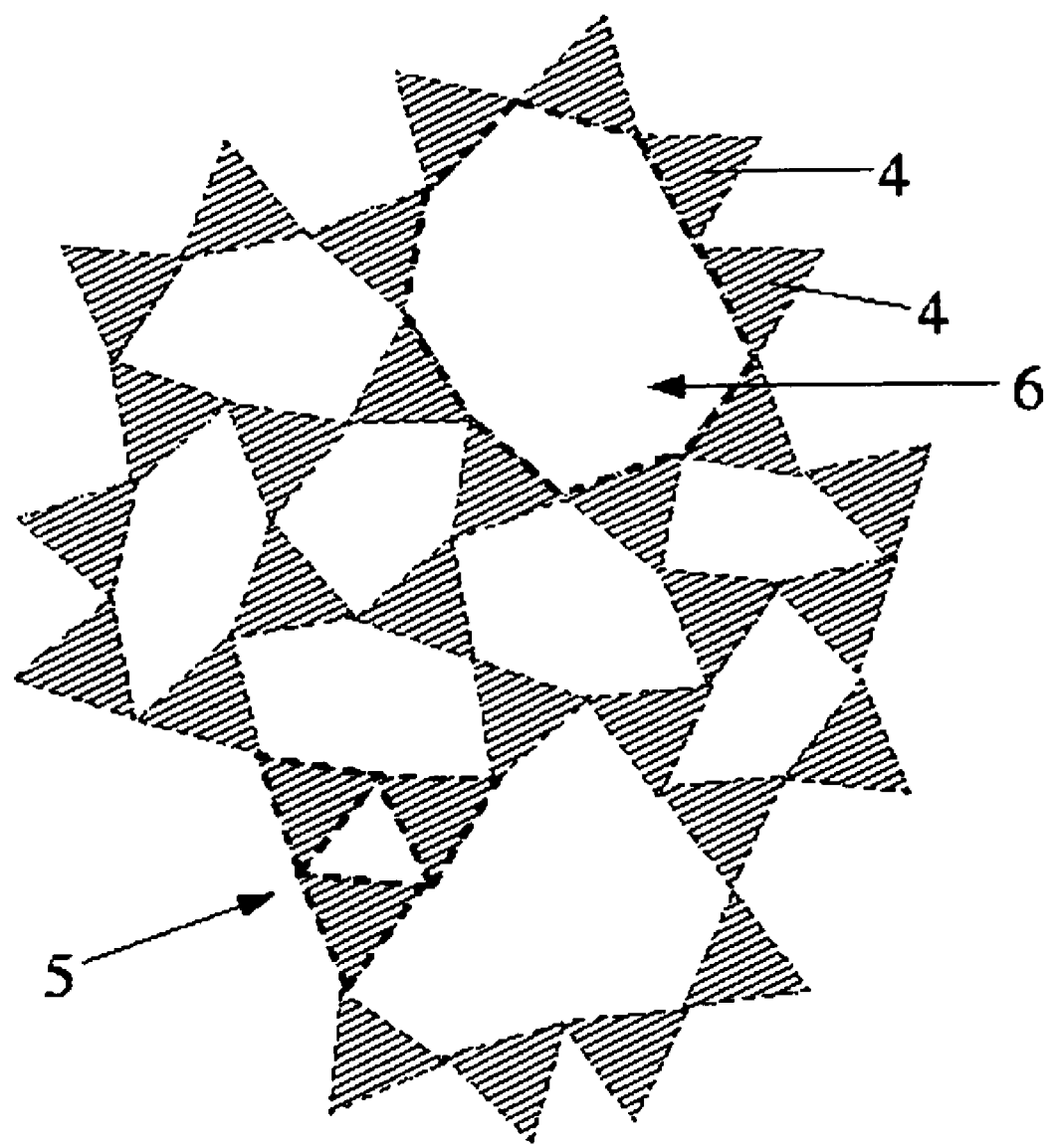
FIG. 9 is a schematic representation of amorphous boron oxide glass. Boron oxide glass is constructed from constituent $BO_3$ triangles which form boroxol rings, networks, and pores or voids of varying size.

FIG. 9 schematically depicts how $BO_3$ triangles 4 and boroxol rings 5 assemble into various regular lattice or network structures that exist as localized regions within a larger amorphous or random network structure, and which can create pores or voids 6 of various sizes. The structural background is one in which $BO_3$ triangles conjoin with substantial randomness, but in a manner which is consistent with the bonding rules that have each oxygen bridging two boron atoms.

Addition of water to boron oxide ($B_2O_3$) creates boric acid ($H_3BO_3$, known more specifically as orthoboric acid) and a structural intermediate between these two species, metaboric acid ($HBO_2$), in proportions that are responsive to local conditions of temperature and the amount of water. Boric acid and metaboric acid, however, are not glassy; boric acid exists in a layered crystalline form similar to that of graphite. In boric acid and metaboric acid, hydrogen forms a hydrogen bond with oxygen. The local chemical properties for hydrogen adsorption on metaboric acid ($HBO_2$) or orthoboric acid ($H_3BO_3$), however, are very similar to that of boron oxide.

As water is removed from boric acid or meta-boric acid by heating or evaporation, boron oxide is reformed. Thus, a composition of boron oxide can vary smoothly from $B_2O_3$ to $H_3BO_3$ depending on water content. Finally, in the presence of sodium ion, species such as hydrated disodium boric acid (Na: $B_2O_3 \cdot H_2O$) form readily. From these various close relationships, it can be seen that boron oxide, orthoboric acid, and metaboric acid collectively represent a genus of compounds comprising boron and oxygen. Further included within this genus are various hydrated forms, such as hydrated boron oxide and common salts, such as sodium borohydrate. Other boron oxide-derived compounds include the following: $Mg_3(BO_3)_2$, $Mg_2B_2O_5$, $NaBO_2$, $KBO_2$, $(Ca(BO_2)_2$, $NaBO_3 \cdot 4H_2O)$, $CaB(OH)SiO_4$, $BPO_4$, $NaBSi_3O_8$, $ZnB_6O_{13}$, $K_5B_5O_8 \cdot 4H_2O$, $KB_5O_8$, $CaB_3O_3(OH)_5 \cdot H_2O$, $CaB_6 \cdot O_{11} \cdot 5H_2O$, $Na_2B_4O_7 \cdot 10H_2O$.

Boron oxide-based compositions can also be modified by doping, or the admixing in of other additive elements or molecules. The purpose of such admixing would be two fold, to confer a higher heat of hydrogen adsorption onto the medium and to confer other more favorable physical properties within the boron oxide based-medium as a whole. Such desirable properties include, for example, mechanical strength and resilience of the solid, or, for another example, the creation of irregularities, pores, and networks, which effectively contribute to an increase in gas-accessible surface area, and hence, increases in hydrogen sorbing capacity. Additionally, the mixing in of other elements or molecules could create compositions which are simply more amenable to various preparative methods which, for example, would allow the creation of high surface area, or high porosity media.

Compounds to be mixed, or doped into the boron oxide-based composition include such oxides as $H_3PO_4$, $SiO_2$, $Al_2O_3$, $Li_2O$, $MgO$, $Na_2O$, $K_2O$, $BeO$, $CaO$, and $SrO$. Activated carbon, itself, is also a potentially useful adjunct to a boron oxide-based medium. Finally, another approach to the application of boron oxide-based medium for hydrogen storage is to use it as a coating over another host structure, one which itself offers advantageous structural features, such as mechanical strength or a high surface area configuration, but does not necessarily have the significant advantage offered by the high heat of adsorption offered by boron oxide-based media. Such host structures could be, for example, activated graphite, or other micro- or meso-, or macro-porous structures, as defined by the International Union of Pure and Applied Chemistry (IUPAC).

From the above description of the inventive boron oxide-based medium for hydrogen storage, its composition and its heat of adsorption which is superior to that of carbon, it can be appreciated that such a storage medium can be prepared by methods that create material with high surface area and/or high porosity, with extensive pores and internally networked surfaces. Such a material, by virtue of its surface availability to hydrogen, provides high capacity hydrogen storage. Such a material, by virtue of its high heat of adsorption, allows the high capacity feature to be operable at high temperature ranges. Finally, such material can be disposed within a container apparatus, with means for controlling the internal temperature, and means providing for the controlled entry and exit of hydrogen. Such a container apparatus has been described in detail, in U.S. application Ser. No. 10/167946 of Bradley et al., entitled "Hydrogen Storage and Supply System".

While the heat of desorption determines the temperature range within which temperature-driven desorption can operate, the total hydrogen storage capacity in terms of weight per cent (the ratio of the weight of hydrogen stored per unit weight of the storage medium) is substantially a function of the available surface area of the medium per unit weight. Surface area is generally understood by those practiced in the art to be surface are as determined by the Brunauer-Emmett-Teller approach which makes use of nitrogen gas as a standard adsorbate (see Example 1, below). Surfaces available for gas storage include both exposed external surfaces and the internal surfaces of pores and networks, provided that the gas has access to these surfaces. Compositional forms that provide high surface area include nanometer-scale particles and more macro-scale structures that are highly porous. Various physical and chemical methods for preparing high surface area or highly porous materials are well known in the art. Milling is the primary method for obtaining small particulate preparations, and can produce particles with diameters of less than 100 nm.

Several chemical approaches to high surface area material preparation are well known, including chemical vapor deposition, templating, precipitation, freeze drying or supercritical drying, and etching. Chemical vapor deposition produces material porous at atomic scale through thermally induced chemical decomposition of gases and deposition of newly constituted material of high surface area. Templating is a process whereby microporous, mesoporous, or macroporous materials are shaped with sacrificial materials which are ultimately discarded; in some cases solid material which is converted to liquid is used as the sacrificial template. Precipitation is a process whereby nano-scale particles are precipitated from super saturated solutions. Supercritical- or freeze drying is a process which creates so-called aerogels, that retain the structural network of a gel as the contained solvent is removed. Finally, etching is a process that enhances surface area by removal of material in such a way as to create a rougher surface.

Boron oxide based materials with a high surface can also be synthesized by coating or grafting a high surface area material with a very thin layer (continuous or discontinuous) of boron oxide derivatives. Materials that could be coated include activated graphite, micro- and mesoporous materials. The coating could be achieved directly from drying a solution of the boron oxide derivative containing a suspension of the high surface area material. Another method includes the grafting of a high surface area material with a boron alcoholate, such as $B(OR)_3$, where R is an organic group, followed by calcination of the resulting material in order to permanently fix or graft the boron oxide group in place (A. Davidson, *Curr. Op. Coll. Interface Science* 2002, 7, 92).

The presence of atomic-scale pores in boron oxide-based media is beneficial for providing pores and networks, both for surface area offered, and for allowing effective diffusion of hydrogen into the boron oxide based media. Computational measurements of the heat of adsorption of hydrogen onto boron oxide pore structures demonstrate that a pore size of less than 0.65 nm precludes hydrogen entry, whereas those with a larger diameter provide free accessibility for hydrogen passage, as well as a heat of adsorption that is equal to or greater than a planar structure. Preferred embodiments of boron oxide-based media for hydrogen storage thus contain a plurality of pores of about 0.65 nm or larger.

Embodiments of this invention include high. surface area material: materials with a surface area in the range of 900 $m^2/g$ to 4000 $m^2/g$ are desirable; preferable are those with a surface area in the range of 3000 $m^2/g$ to 4000 $m^2/g$, and more preferable is a surface area in the range of 3000 $m^2/g$ to 4000 $m^2/g$. Most preferable would be materials with a surface area greater than 4000 $m^2/g$. Embodiments of this invention also include highly porous material: preferably with a porosity in the range of 10% to 90%, more preferably in the range of 20% to 80%, and most preferably in the range of 30% to 70%.

This invention and its embodiments are described above, and in the example below, in sufficient detail to provide those skilled in the art with information relevant to apply the novel principles and to construct and use such specialized components as are required. However, it is to be understood that the invention can be carried out by different equipment, materials and systems, and that various modifications, both as to the equipment and operating procedures, can be accomplished without departing from the scope of the invention itself.

EXAMPLES

Figure 10:
FIG. 10 is a transmission electron micrograph of boron oxide particulate sample prepared by rapidly condensing boron oxide vapor diluted in a carrier gas.

Boron Oxide Sample Preparation by Various Methods and Measurement of the Heat of Adsorption Boron oxide particles were synthesized by rapidly condensing vapors of boron oxide diluted in argon, a neutral carrier gas as follows: Boron oxide was placed on a platinum crucible situated within a boron nitride tube. The boron nitride tube, itself, was enclosed within an alumina tube. The alumina tube (containing the inner boron nitride tube and crucible within), which can be understood collectively as a housing in which to hold boron oxide while being heated, were placed at the center of a tubular oven. The oven was heated rapidly to a temperature in the range of 1,100-1,500° C., thereby creating a vapor pressure of $B_2O_3$ in the range $1\times10^{-6}$-$2\times10^{-3}$ bar, respectively. Once the oven reached the preset temperature, a flow of neutral gas (argon) into the oven was initiated. The gaseous outflow stream from the oven was captured and collected as particles on a filter; FIG. 10 is a transmission electronmicrograph of the resulting sample. In a typical procedure using a 1-inch alumina tube, a temperature of 1450° C. and an argon flow rate of 1,000 standard cubic centimeters/min (sccm), particles having a diameter of about 15 nm were collected, thus creating material with a surface area in the range of 80-100 $m^2/g$.

Figure 11:
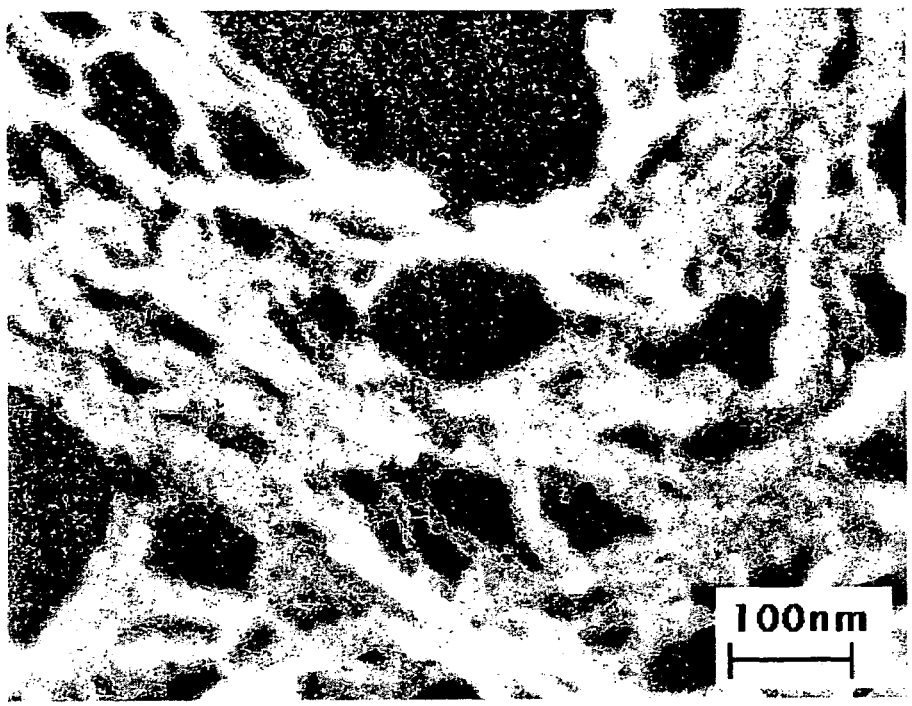
FIG. 11 is a scanning electron micrograph of a boron oxide particulate sample prepared by reacting diborane gas, highly diluted in a neutral gas, with oxygen.

Boron oxide particles were also synthesized using controlled oxidation of boron molecular precursors. In this approach, diborane, highly diluted in a neutral gas, was reacted with oxygen. The neutral gas, argon, and diborane were mixed in line, and injected into the reaction chamber. Oxygen was separately injected into the reaction chamber. Care was taken to ensure that the diborane was not heated prior to its injection into the reaction chamber, as it easily decomposes into higher boranes. The downstream gaseous exhaust of the reaction chamber, including particulate boron oxide, was collected on a filter; FIG. 11 is a scanning electron-micrograph of such a sample. This reaction produces some water; to substantially avoid condensation and subsequent formation of $HBO_2$ or $H_3BO_3$ within the boron oxide, the exhaust stream and filter were kept warm. Particles having a diameter of 10 nm were obtained, thereby creating material with a surface area in the range of 120-150 $m^2/g$.

Higher dilution of the molecular precursor during this procedure leads to the creation of 5 nm diameter particles, thus creating material with a surface area of 250-300 $m^2/g$. In this preparative approach, in order to avoid large consumption of neutral gas, the diluting gas can be recirculated, after removal of water. Other molecular precursors include trialkylborons, such as $(CH_3)_3B$, trialkyl borate (such as $(CH_3O)_3B$), or any other organoboron precursor whose oxidation induces the formation of boron oxide. With these precursors, carbon dioxide is produced, and preferably would be stripped from the diluting gas if recirculation is included in the process.

Figure 12:
FIG. 12 is a scanning electron micrograph of a boron oxide sample prepared by freeze-drying.

Another synthetic pathway is represented by dissolving boron oxide or boric acid in water and freeze-drying, or supercritical drying, the solution thus obtained. FIG. 12 is a scanning electron micrograph of a sample of boron oxide prepared by freeze-drying. Inclusion of an additive within the solution such as $Mg(OH)_2$ or NaOH is often helpful toward the goal of achieving high surface area preparations. Supercritical drying processes can yield materials with surface areas ranging upward to at least about 900 $m^2/g$. These higher surface area results can be achieved by: (1) obtaining a gel based on the hydrolysis of a boron alkoxide (either alone or mixed with other metal alkoxides) dissolved in an alcohol, such as methanol or ethanol; or (2) by supercritical drying the gel using supercritical carbon dioxide. The latter step can be performed using standard commercial supercritical drying equipment.

Pertinent to these various synthetic approaches is the fact that high surface area boron oxide is very hygroscopic. Therefore, in order to avoid material hydration, it is preferable that material handling take place either in dry air or in a dry box. Finally, the particulate preparations can include populations of particles partially bound to each other in clusters.

Adsorption isotherms of boron oxide samples prepared by chemical vapor deposition were measured using a commercial porosimeter (Micromeritics ASAP 2010). Samples were heated in vacuum to degas them and to drive out water. Samples were heated at 90° C. for two hours, at 150° C. for eight hours, and at 200° C. for eight hours. After treatment, the gas uptake for the samples was measured as pressure-adsorption isotherms in fixed-point baths at a variety of temperatures. High purity (99.9996%) nitrogen was used for Brunauer-Emmett Teller surface area analysis, and high purity hydrogen was used for storage measurements.

Figure 13:
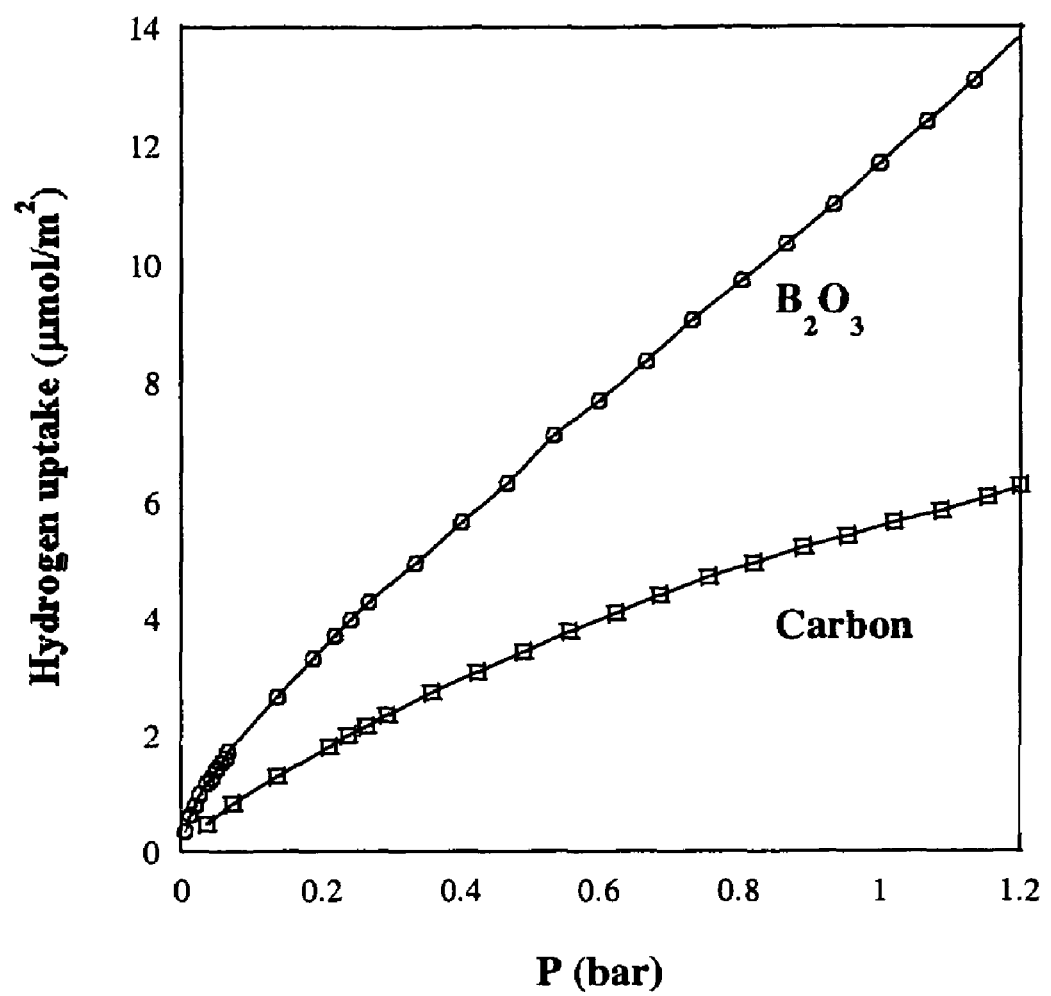
FIG. 13 shows a comparison of hydrogen uptake by carbon and boron oxide (mol/m$^2$) at 77K, as a function of pressure, over a range of 0.1 to 1.2 bar.

FIG. 13 shows the measured hydrogen uptake (mol/$m^2$) for samples of carbon and boron oxide at 77 K, normalized to the surface areas of the respective samples, at pressures ranging from 0.01 bar to 1.2 bar. The greater heat of adsorption of boron oxide manifests itself in a significantly greater hydrogen sorption. These data are corroborated by other studies which have compared the quantity of hydrogen uptake by carbon and boron oxide at 1 atmosphere at temperatures ranging from 80 K to 175K. At these higher temperatures, boron oxide adsorbs hydrogen at significantly high levels that does carbon.

The application of this inventive hydrogen sorbing medium is likely to be in fuel tanks with a holding pressure of about 1 bar to about 30 bar, more generally in the range of about 3 bar to about 20 bar. As described above, and as depicted in FIG. 2, a comparison of Langmuir.

The invention claimed is:

1. A composition for storing hydrogen, comprising boron oxide and at least one boron oxide derivative, wherein the composition is configured to absorb hydrogen with a heat adsorption of about 10 kJ/mol to about 13 kJ/mol, the adsorption being substantially physisorptive in nature; and wherein the composition is configured to have a surface area to mass ratio of at least about 150 m$^2$/g.

2. The composition of claim 1, wherein the boron oxide derivative is selected from the group consisting of orthoboric acid, metaboric acid, hydrated boric acid, and disodium borohydrate.

3. The composition of claim 2, wherein the composition has a surface area to mass ratio of at least about 900 m$^2$/g.

4. The composition of claim 2, wherein the composition is in particulate form.

5. The composition of claim 2, wherein at a pressure of between about 1 bar and about 30 bar, the composition substantially adsorbs hydrogen at temperatures less than about 200K and greater than about 20K.

6. The composition of claim 2, further comprising hydrogen adsorbed to the medium.

7. The composition of claim 2, wherein composition is configured to adsorb hydrogen with a heat of adsorption in the range of about 9 kJ/mol and about 13 kJ/mol.

8. The composition of claim 2, wherein the composition is configured to store and release hydrogen within a temperature range of about 20K to 200K and wherein the composition retains a substantial portion of stored hydrogen up to a temperature of at least about 140K.

9. A composition for storing hydrogen comprising boron oxide and at least one boron oxide derivative selected from the group consisting of $Mg_3(BO_3)_2$, $Mg_2B_2O_5$, $NaBO_2$, $KBO_2$, $(Ca(BO_2)_2$, $NaBO_3.4H_2O)$, $CaB(OH)SiO_4$, $BPO_4$, $NaBSi_3O_8$, $ZnB_6O_{13}$, $K_5B_5O_8.4H_2O$, $KB_5O_8$, $CaB_3O_3(OH)_5.H_2O$, $CaB_6O_{11}.5H_2O$, and $Na_2B_4O_7.10H_2O$.

10. The composition of claim 9, further comprising at least one additive selected from the group consisting of $H_3PO_4$, $SiO_2$, and $Al_2O_3$.

11. The composition of claim 9, wherein the composition is configured to store hydrogen substantially by physisorption.

12. The composition of claim 9, wherein the composition has a plurality of pores, the pores having a diameter of at least about 0.65 nm.

13. The composition of claim 9, wherein the composition has a surface area to mass ratio of at least about 150 m$^2$/g.

14. The composition of claim 9, wherein the composition has a surface area to mass ratio of at least about 900 m$^2$/g.

15. The composition of claim 9, wherein the composition is in particulate form.

16. The composition of claim 9, wherein the composition is configured to store hydrogen with a heat of hydrogen adsorption of about 10 kJ/mol to about 13 kJ/mol.

17. The composition of claim 9, wherein at a pressure of between about 1 bar and about 30 bar, the composition substantially adsorbs hydrogen at temperatures less than about 200K and greater than about 20K.

18. The composition of claim 9, wherein at a pressure of between about 1 bar and about 30 bar, the composition substantially adsorbs hydrogen at temperatures less than about 140K and greater than about 20K.

19. The composition of claim 9, further comprising hydrogen adsorbed to the medium.

* * * * *